Jan. 23, 1968  W. GUTTMANN ET AL  3,365,045
GASOLENE PUMP CONTROL SYSTEM
Filed Feb. 14, 1966
5 Sheets-Sheet 1
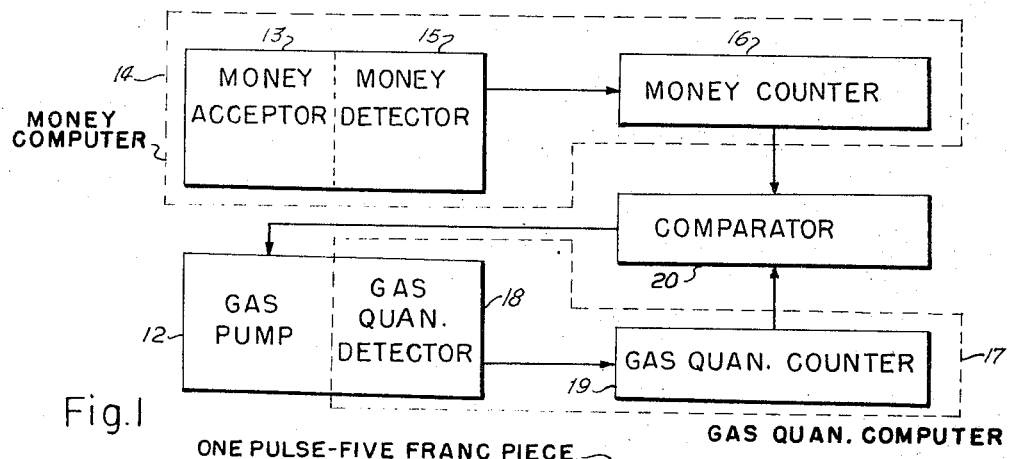
Fig. 1
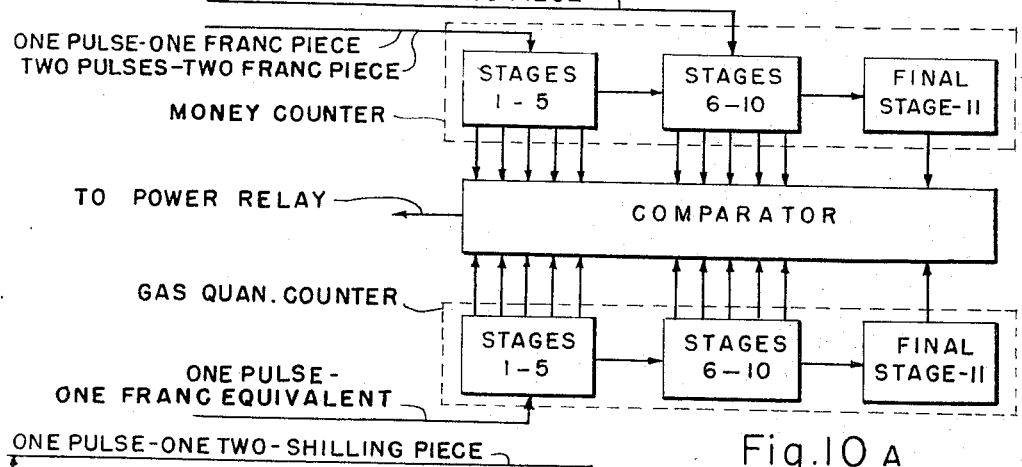
Fig. 10 A
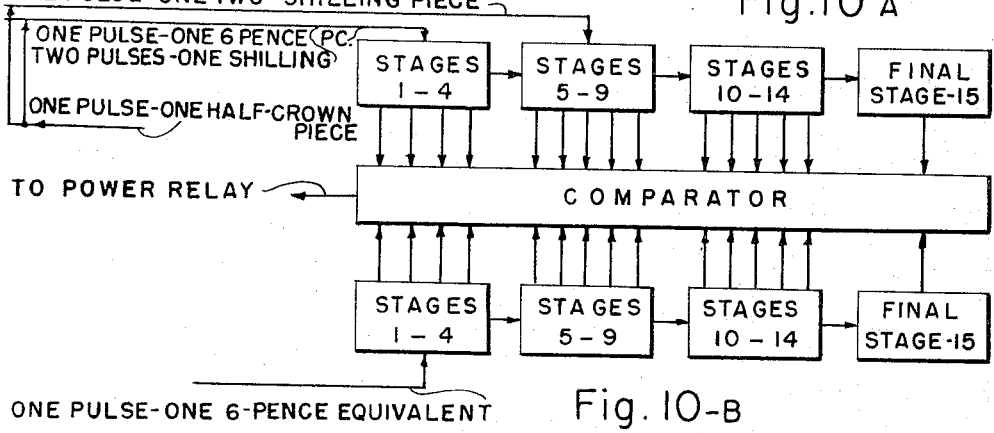
Fig. 10-B
INVENTORS
Wolf Guttmann
Kenneth H. Miller
BY *Thomas A. Harwood*
ATTORNEY INVENTORS
Wolf Guttmann
Kenneth H. Miller BY *Thomas A. Harwood*

ATTORNEY

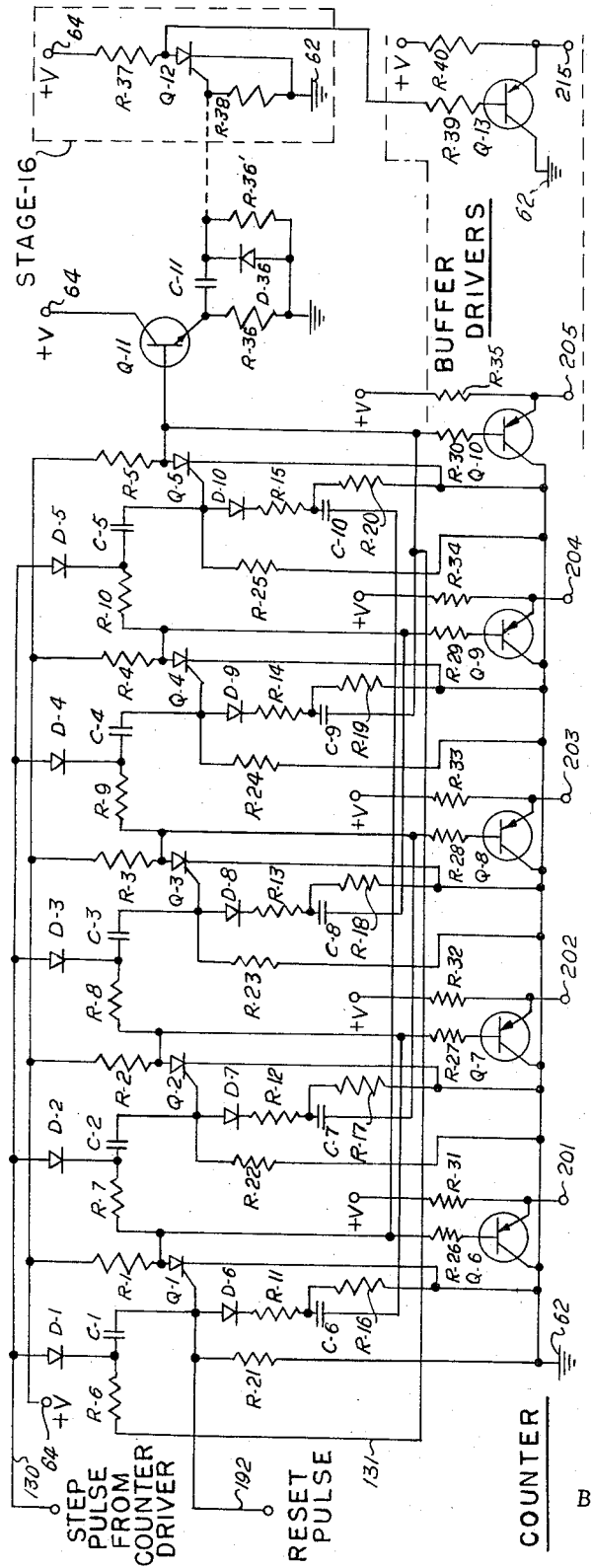
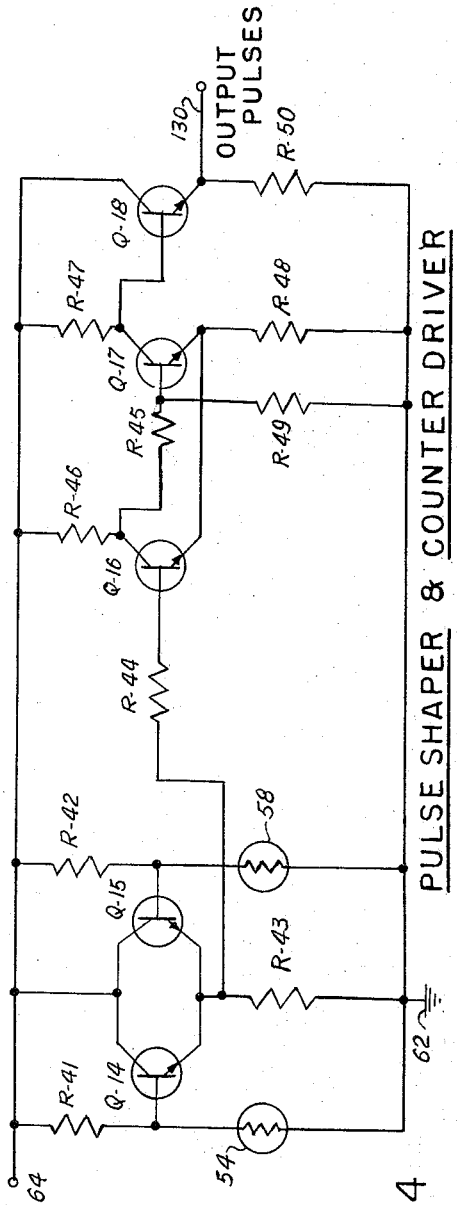
Fig.3
Fig.4

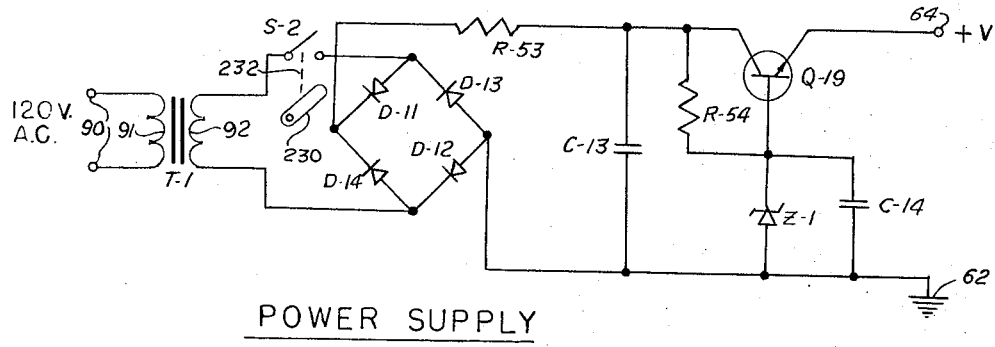
POWER SUPPLY
Fig. 5
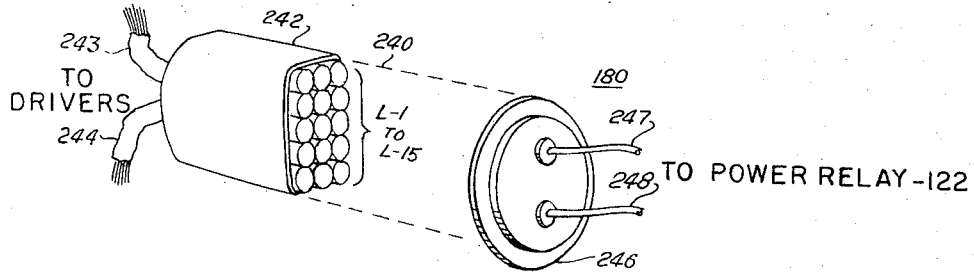
Fig. 7
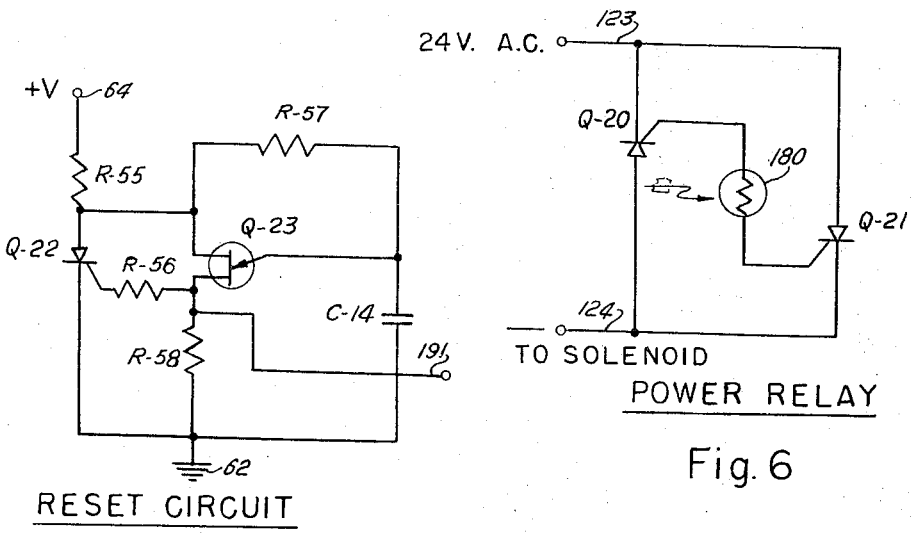
RESET CIRCUIT
Fig. 8
POWER RELAY
Fig. 6

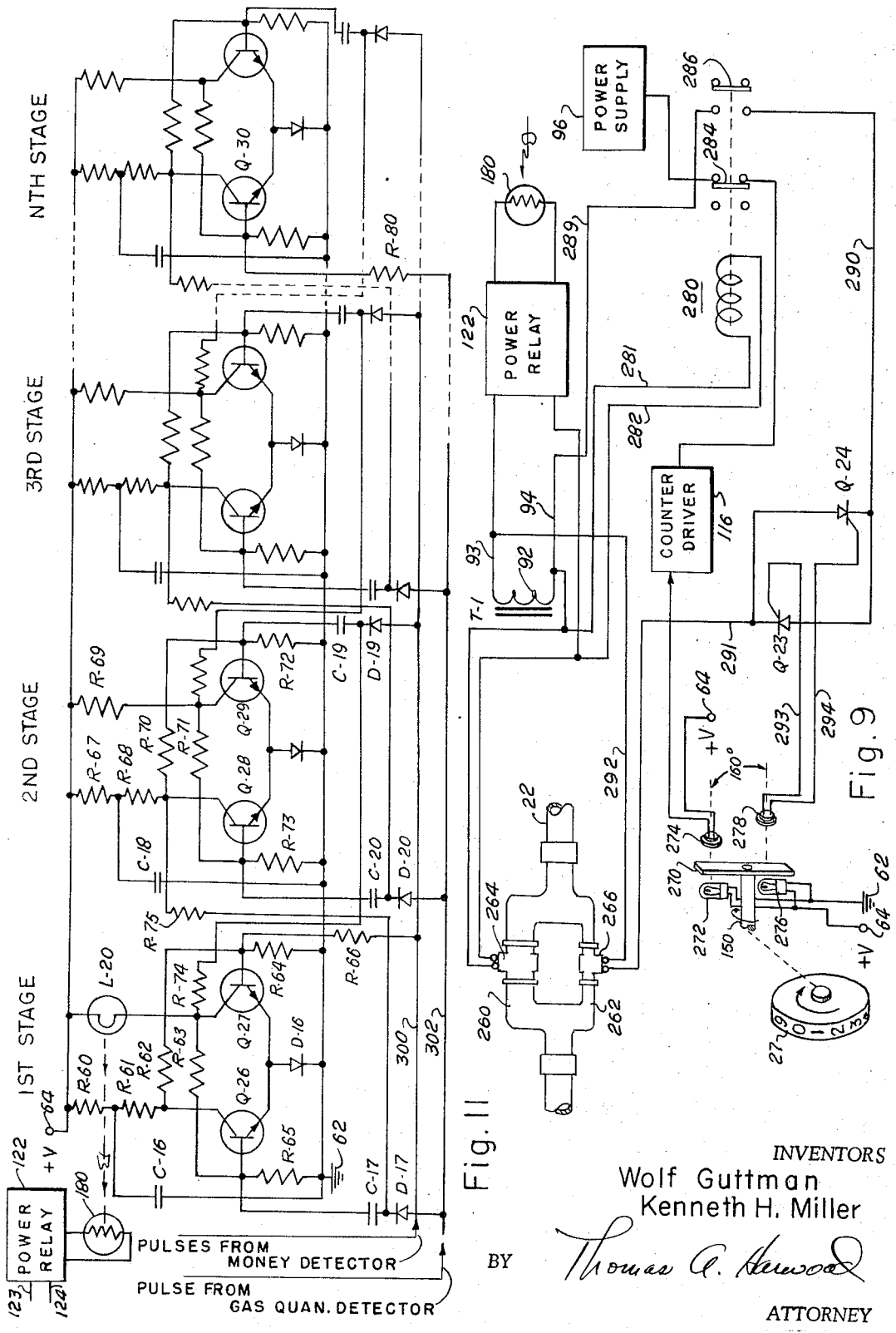

United States Patent Office 3,365,045
Patented Jan. 23, 1968

3,365,045
GASOLENE PUMP CONTROL SYSTEM
Wolf Guttmann and Kenneth H. Miller, Austin, Tex., assignors to Davis Electronic Corporation, Austin, Tex., a corporation of Delaware
Filed Feb. 14, 1966, Ser. No. 538,116
13 Claims. (Cl. 194—13)

ABSTRACT OF THE DISCLOSURE

A self-service system for operating a gasolene pump by depositing money in a system is provided. The system is operative in response to the deposit of money therein by counting the deposited money and actuating the pump to deliver a quantity of gasolene equal to the equivalent of the money deposited by the customer.

---

There is a considerable need for self-service gasolene pumps whereby a purchaser can deposit an amount of money into a money acceptor equivalent to the quantity of gas desired and deliver his own gasolene, and whereby the gas pump automatically turns off when this quantity of gasolene is delivered. This need arises from the fact that there is an ever increasing labor shortage for service station attendants. Moreover, drive-in groceries and after-hours retail establishments are growing in popularity, including the variety of products that are sold. These types of establishments operate on the basis of a minimum number of employees to maintain a relatively high profit margin operation. It will be apparent that gasolene sales in these establishments is desirable if an additional employee is not required to attend the pump.

The present invention provides a system for controlling the operation of a gasolene pump when money is deposited in the system, so that the proper quantity of gasolene can be delivered by the customer. The system detects and counts the amount of money deposited and actuates the pump for delivery in response to the deposit of the money for the manual delivery by the customer of gasolene in quantity that is equivalent to the amount of money deposited. The system comprises computer means, including an acceptor into which money is deposited, for computing the amount of the deposited money to produce an output, and for computing the quantity of gasolene delivered in terms of the money equivalent thereof to cancel the output when the delivered gasolene quantity equivalent amount of money is equal to the amount of money deposited. An actuator means operatively connected to the gasolene pump actuates the pump for gasolene delivery responsive to the output from the computer means and shuts off the pump when the output is canceled. In more particular, the system comprises a money acceptor within which various denominations of money of the monetary system of the particular country in which the system is used are deposited and detected. Money detectors or receivers (also known as coin rejectors) are commonly available for various denominations of the monetary systems of many countries. The system employs a detector to generate a series of pulses representative of the amount of money deposited, wherein the pulses drive a counter means. Another detector is employed to monitor the quantity of gasolene delivered and generates another series of pulses applied to the counter means. The gas quantity detector preferably monitors the mechanical computer within the gasolene pump in terms of the money equivalent of the gasolene quantity delivered. The counter means is effective to produce an output by which the actuator means controls the gasolene delivery when the pulses from the money detector are applied thereo, and to cancel the output when the equivalent amount of money counted in response to the series of pulses from the gasolene quantity detector is equal to the amount of money counted in response to the series of pulses from the money detector. In one particular embodiment, the counter means comprises a single counter which is caused to switch to a plurality of states in a sequential order responsive to the series of pulses from the money detector, whereby the output is generated so long as the counter is switched to any one of these plurality states. The series of pulses from the gasolene quantity detector are applied to the counter to cause it to switch through the states in an opposite sequential order, so that the output is canceled when the counter is no longer switched to any one of the plurality of states. Thus the counter counts up in response to the money deposited and counts down in response to the gasolene delivered until the money count is canceled.

In another particular embodiment, separate counters are employed for the money detector and gasolene quantity detector having pluralities of corresponding outputs, wherein various outputs and combinations thereof represent different amounts of money counted. A comparator operatively connected to the gasolene pump is used to compare the outputs between the two counters and functions to cut off the delivery of gasolene when output signals from one of the counters corresponds exactly to the outputs of the other counter, or when the two counters register the same count. This is an indication that the quantity of gasolene delivered, as converted to the money equivalent thereof, is equal to the amount of money deposited. The system is actuated for gasolene delivery by the comparator when money is initially deposited and is maintained operative so long as the two counters produce output signals at non-corresponding outputs. When the two counters are brought into coincidence at their outputs, the comparator shuts off the gasolene pump.

The system is adaptable for operation for the monetary systems of different countries. To account for the different systems, the basic system remains unchanged, wherein slight modifications in the detectors and counters are all that is required. Although many different counters can be used, a series chain of flip-flop stages is preferred for the system which uses a single counter only, and a ring counter arrangement is preferred in the embodiment using two separate counters. Variations of the number of counter stages and the division of the counter into separate and distinct counting stages are made to accommodate the various monetary systems.

Many other objects, features and advantages of the invention will become apparent from the following detailed description thereof when taken in conjunction with the appended claims and the attached drawing wherein like reference numerals refer to like parts throughout the several figures, and in which:

FIGURE 1 is a block diagram of one embodiment of the control system provided by the invention;

FIGURE 3 is an electrical schematic diagram of a ring counter employing five stages suitable for use in the system shown in FIGURE 2;

FIGURE 4 is an electrical schematic diagram of a pulse shaper and counter driver used to drive the various counter stages of the system in response to pulses from the money and gasolene quantity detectors;

FIGURE 5 is an electrical schematic diagram of a low voltage power supply used in the system;

FIGURE 6 is an electrical schematic diagram of a power relay activated by the system to control a solenoid valve within the gasolene delivery line;

FIGURE 7 is an exploded, perspective view of optical means used by the comparator of the system of FIGURE 2 to actuate the power relay;

FIGURE 8 is an electrical schematic diagram of a reset circuit employed to reset the counters for the proper starting sequence when the system is initially activated.

FIGURE 9 is a schematic diagram of a different gasolene quantity detector used in another embodiment of the system;

FIGURE 10A and 10B are block diagrams illustrative of counters used in the system for Great Britain and Switzerland; and FIGURE 11 is an electrical schematic diagram of a different counter used in another embodiment of the invention, including output means for controlling the gasolene pump.

Figure 2:
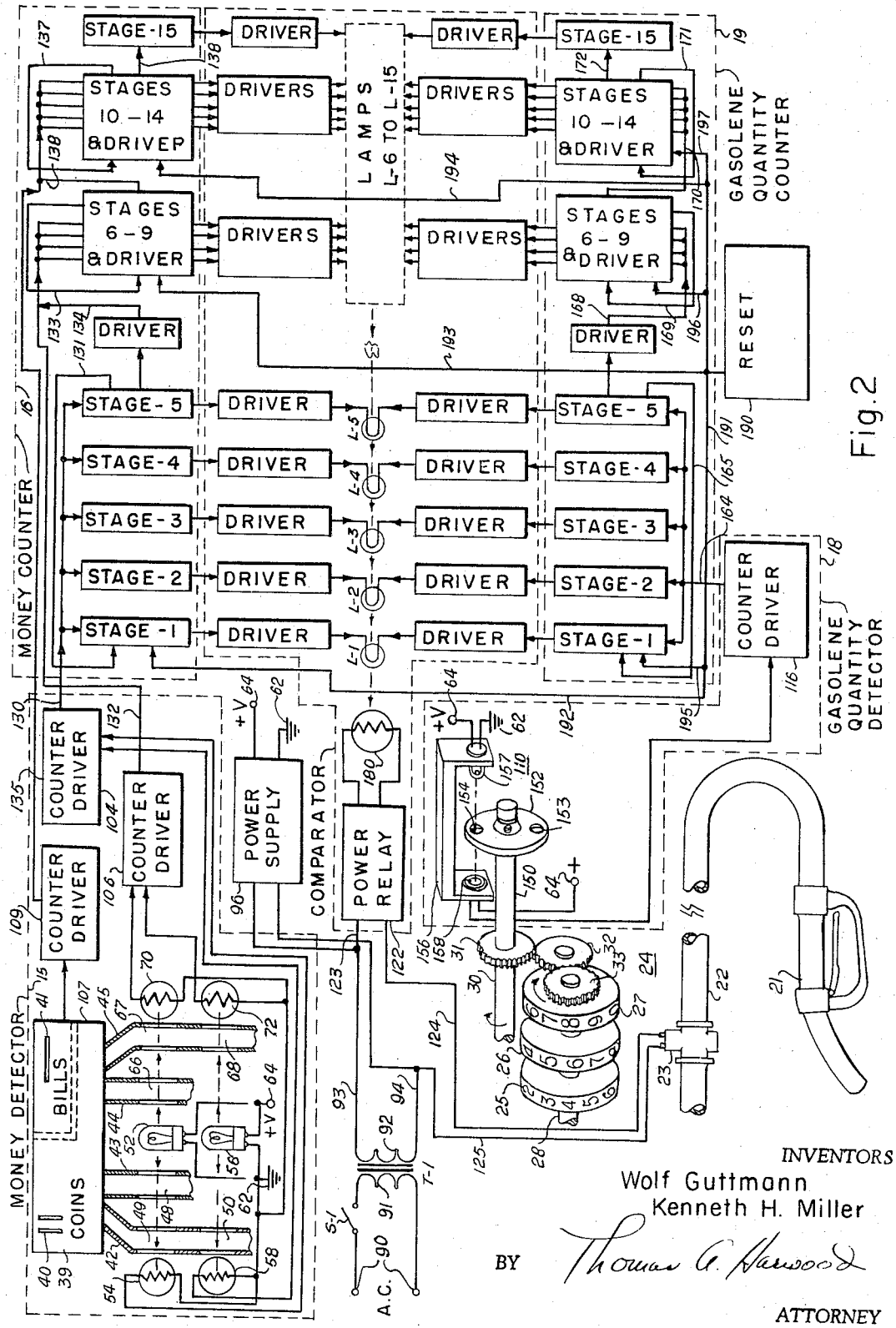
FIGURE 2 is a block diagram, partly in schematic, of the control system of FIGURE 1 adapted for accepting money denominations used in the United States and Canada.

A block diagram of one embodiment of the system using separate counters for the money detector and gasolene quantity detector and a comparator is shown in FIGURE 1, wherein a gasolene pump 12 is equipped with a coin rejector mechanism 13 (referred to herein as a coin or money acceptor). The system is primarily a self-service system for controlling the operation of a gasolene pump, whereby the customer deposits an amount of money into the money acceptor equivalent to the quantity of gasolene to be purchased. Coin rejector mechanisms are commonly available for use with the various denominations and currency of many different countries. These coin rejector mechanisms function to distinguish different denominations of coins and direct them through correspondingly different channels within the mechanism. Dollar bill machines are also available which will accept a one dollar bill and make a determination as to the genuine character and denomination of the bill.

A money computer 14 is operatively associated with the money acceptor to detect the particular denominations of money deposited, both coins and bills, and the number thereof, and is operative to generate an output signal which is uniquely characteristic of the exact amount of money deposited. The money computer basically comprises a money detector 15 which operates in conjunction with the money acceptor to detect the particular denominations of money deposited and the number thereof to generate a series of pulses representative of the particular denominations of money and the number of each denomination deposited. This series of pulses is applied to a money counter 16 within the money computer which functions to operate on the series of pulses to generate an output signal uniquely characteristic of the total amount of money deposited.

A gasolene quantity computer 17 is operatively associated with the gasolene pump to detect the amount of gasolene delivered to produce an output signal that is uniquely characteristic of the money equivalent of the quantity of gasolene delivered. Accordingly, a gasolene quantity detector 18 is operatively connected to the gasolene pump to monitor the quantity of gasolene delivered, preferably in terms of the money equivalent thereof, to generate a series of pulses which are applied to a gasolene quantity counter 19. The gasolene quantity counter operates on the series of pulses from the gasolene quantity detector to generate the output signal which is uniquely characteristic of the money equivalent of the quantity of gasolene delivered. The output signals from the money counter 16 and gasolene quantity counter 19 are applied to a comparator 20 which controls the operation of the gasolene pump. The money counter 16 is capable of producing a plurality of output signals each of which is uniquely characteristic of a different amount of money. Similarly, the gasolene quantity counter is adapted to produce a plurality of output signals which are uniquely characteristic of different money equivalents of the quantity of gasolene delivered. When the system is initially activated by the purchaser by the deposit of his money in the money acceptor, an output signal is generated by the money counter and applied to the comparator, this particular output signal being representative of the money deposited. As yet, however, no gasolene has been delivered and there is either no output signal from the gasolene quantity counter or it is different from that of the money counter. The comparator functions to maintain the gasolene pump operative when the signals applied thereto from the two counters are different, or are not exactly the same in terms of money. Thus the gasolene pump is made operative by the comparator and the purchaser may then deliver gasolene. As the purchaser delivers gasolene, the gasolene quantity detector monitors the quantity of gasolene delivered and the gasolene quantity counter produces a sequence of output signals which represent an increasing amount of money equivalent of the gasolene quantity delivered. When the output signal from the gasolene quantity counter becomes equal in money equivalent to the output signal from the money counter, the comparator deactivates the gasolene pump in response thereto. Thereafter, the gasolene pump cannot be made operative until additional money has been deposited in the money acceptor.

The system as broadly described above can be readily adapted to accommodate coin and bill denominations of many different countries, wherein these particular money acceptor or rejector mechanisms are readily available. However, because of the different monetary units of the various countries, the money detector and counter and corresponding gas quantity detector and counter must be altered accordingly to function properly with the particular monetary system to which it is applied. All of this will become more apparent from the following description of one embodiment of the invention adapted for use in the United States and Canada, and the modifications disclosed thereafter for systems adapted for use in foreign countries.

One embodiment of the system of the invention adapted for use in the United States and Canada is shown in the block diagram, partly in schematic, of FIGURE 2. A conventional gasolene dispenser 21 is connected to a gasolene delivery hose 22 having a solenoid valve 23 connected therein. The solenoid valve is electrically operated and can be either of the normally opened or normally closed type, although the valve is of the normally closed type for the system to be described. A part of the mechanical computer 24 of a conventional gasolene pump is also shown (the gasolene pump and housing itself not being shown). The part of the computer shown comprises a dollar wheel 25, a dime wheel 26 and a penny wheel 27 mounted coaxially on a shaft 28, wherein the numerals of the wheels facing outward can be viewed through the open window in the pump by the purchaser. The dollar wheel registers the number of dollars of gasolene delivered, the dime wheel indicates the tenths of dollars of gasolene delivered in excess of the dollar amount, and the penny wheel indicates the hundredths of dollars of gasolene delivered in excess of the tenths of dollars delivered. A gear 33 is attached to the penny wheel for rotation therewith and is meshed with another gear 32 of the same diameter and number of teeth to provide a 1:1 gear ratio. A cylindrical shaft 30, which is driven by a mechanism (not shown) of the mechanical computer carries a gear 31 for rotation therewith, the latter of which is meshed with gear 32 and is also of a 1:1 gear ratio. The degree of rotation of shaft 30 is proportional to the quantity of gasolene delivered as determined by the mechanical computer of the gasolene pump. Thus rotation of shaft 30 causes the penny wheel 27 to be rotated accordingly, whereby one complete revolution of the penny wheel is equivalent to the delivery of ten cents worth of gasolene. Upon each complete revolution of the penny wheel, the penny wheel engages the dime wheel by a dog (not shown) to rotate the dime wheel one-tenth of one complete revolution. Similarly, one complete rotation of the dime wheel causes the dollar wheel to be rotated one-tenth of one complete revolution by means of a dog (not shown). The function of the mechanical computer of the gasolene pump just described is conventional and forms no part of the present invention, per se. However, an understanding of the operation of this part of the gasolene pump is necessary to an understanding of the control system of the invention and the means for monitoring the quantity of gasolene delivered, all as will be described below. It will be apparent, however, that the purchaser may deliver gasolene through the dispenser 21 anytime when the gasolene pump motor is running, and so long as solenoid valve 23 is open.

A coin acceptor mechanism 40 (sometimes referred to as a coin rejector mechanism) is provided at any suitable location on or adjacent a gasolene pump and has slots 40 and 41 to receive coins and dollar bills, respectively. A detailed description of the operation of the coin acceptor mechanism will not be given here, as such mechanisms are readily available on the market. However, these mechanisms will accept a plurality of denominations of coinage and is adapted to make a determination of the various denominations and the number thereof. Moreover, the dollar bill part of the mechanism is capable of determining the genuine character of a bill and the particular denomination thereof and is further capable of generating any number of suitable outputs in response thereto. For the part of the money acceptor that handles the coinage, there are provided a plurality of channels 42, 43, 44 and 45 through which the different denominations of coins are directed, wherein the present description will have reference only to the monetary system used in the United States and Canada. The coin acceptor directs all nickels through channel 43, all dimes through channel 42, all quarters through channel 44, and all half-dollars through channel 45, there being no provision for a penny channel. These channels, it will be noted, are standard equipment on conventional coin rejector mechanisms, and the coin rejector mechanism is designed to reject any slugs or improper denominations.

Coinciding holes 48 are provided in opposite walls through channel 43, and coinciding holes 49 aligned with holes 43 are provided in opposite walls through channel 42. Below holes 48, channel 43 is directed away from channel 42 as shown schematically. Another set of coinciding holes 50 are provided in channel 42 beneath holes 49. A light source 52, which can be any suitable light bulb connected at one terminal to ground 62 and at the other terminal to a supply voltage 64 (also designated as +V) is situated adjacent holes 48 in alignment therewith so that the light from the light source passes through both holes 48 and 49. A light detector 54, which can be any suitable photocell, photovoltaic device, or any other photosensitive device, is positioned adjacent holes 49 in alignment with the light source 52, so that the light passing through holes 48 and 49 from the light source is directed onto photocell 54. Another light source 56 is positioned in alignment with holes 50 in the lower portion of channel 42, and another photocell 58 is positioned in alignment with the holes and the light source 56, so that this light is directed on photocell 58. One terminal of each of photocells 54 and 58 is connected to ground 62 and the other terminals of the photocells are connected as inputs to a pulse shaper and counter driver 104, the latter of which drives one part of the money counter.

As a nickel is directed through channel 43, it will interrupt the light beam from light 52 and the impedance of photocell 54 will be increased accordingly, whereas the impedance of photocell 54 is normally relatively low when the light is incident thereon. Therefore, the momentary interruption of the light beam causes a positive voltage pulse to be applied to one of the inputs of the pulse shaper and counter driver 104. A dime directed through channel 42 causes the light beam from light source 52 to be momentarily interrupted so that a positive voltage pulse is also applied by photocell 54 to one of the inputs of the counter driver 104. As the dime falls through the channel, it also momentarily interrupts the light beam from light source 56 to cause a positive voltage pulse to be applied by photocell 58 to the other input of the counter driver 104. Thus a nickel deposited in the money acceptor causes a single pulse to be applied to the counter driver 104, whereas a dime deposited in the money acceptor causes two pulses to be applied to the counter driver 104.

Channels 44 and 45 through which quarters and half-dollars are directed, respectively, are similarly constructed. Channel 44 has coinciding holes 66 defined in opposite walls thereof in alignment with the same light source 52, and coinciding holes 67 are provided in the opposite walls of channel 45 in alignment with holes 66. A photocell 70 is positioned adjacent holes 67 in alignment therewith. Another set of holes 68 is provided in opposite walls of channel 45 below holes 67, and another photocell 72 is positioned adjacent the holes in alignment therewith, with holes 68 and photocell 72 being aligned with light source 56. Therefore, a quarter directed through channel 44 interrupts the light beam from light source 52 and causes one positive voltage pulse to be applied by photocell 70 to one input of another counter driver 106. A half-dollar directed through channel 45 interrupts the light beams from light sources 52 and 56 and causes two positive voltage pulses to be applied by photocells 70 and 72 to the two respective inputs of the counter driver 106.

A dollar bill acceptor 107 is optional with this system, but if used, is effective to determine the genuine character and denomination of the dollar bill deposited therein, and is adapted to produce a signal accordingly. This signal can be in the form of a positive voltage output pulse which is applied to another pulse shaper and counter driver 109 through connections as shown.

The foregoing describes the money detector 15 (shown in dashed outline) which is used to drive a money counter 16 (also shown in dashed outline), with the exception of a detailed description of the pulse shaper and counter driver which will be described later. A gasolene quantity monitor 110 is operatively connected to drive shaft 30 of the mechanical computer of the gasolene pump and monitors the quantity of gasolene delivered in terms of the money equivalent thereof. This particular monitor will be described in detail hereinafter, but it will be remarked that it forms a part of a gasolene quantity detector 18 (shown in dashed outline) that is used to drive a gasolene quantity counter 19 (also shown in dashed outline). Another pulse shaper and counter driver 116 is employed within the gasolene quantity detector to receive pulses from the monitor 110 for driving the counter. The money counter and gasolene quantity counter have a plurality of outputs which are applied to a comparator 20 (shown in dashed outline) within the latter of which there is included a power relay 122 for operating a solenoid valve 23 within the gasolene delivery line. The power relay is supplied with power from the secondary connection 93 of the secondary 92 of a transformer T-1 through connection 123. The other terminal of the power relay is connected to one terminal of the solenoid 23 through connection 124, with the other terminal of the solenoid valve being connected to the other secondary connection 94 of transformer T-1 through connection 125. As prevously noted, the comparator functions to operate the solenoid valve, and opens the solenoid valve initially after money is deposited and accepted in the coin acceptor and registered by the money counter, and closes the solenoid valve when the quantity of gasolene delivered in terms of the money equivalent thereof is equal to the amount of money deposited in the coin acceptor.

The entire system is supplied with power from an A.C. voltage source, such as 120 A.C., 240 A.C., e.g., through terminals 90 which are connected to the primary 91 of a transformer T-1 through a main switch S-1. Transformer T-1 is a step down transformer and produces 24 volts A.C. at the secondary 92 thereof. A low voltage D.C. power supply 96 is connected at its input across connections 93 and 94 of secondary 92 of the transformer to produce a D.C., rectified +18 volts at the output between +V terminal 64 and ground 62.

Reference will now be had to the particular counters used within the system in the embodiment shown in FIGURE 2. For application in the United States and Canada, it has been found suitable to use three separate groups of counter stages, and a final counter stage. The first set of counter stages, denoted stages 1–5, are driven by the pulse shaper and counter driver 104 through connection 130. The counter is initially actuated by applying +V or supply voltage 64, to the various stages thereof and resetting the counters to provide the proper counting sequence when money is initially deposited. All of this will be described in more detail below, wherein stage 1 of the first set of counter stages is initially actuated to provide the proper starting sequence for counting. The function of the counter driver 104 is to provide sharp voltage pulses applied to connection 130 which have sufficient power to drive the counter stages. Moreover, one voltage pulse from counter driver 104 is applied to connection 130 for each voltage pulse applied to either of its inputs. A voltage pulse from the counter driver is applied to all five stages of the first set of counter stages, wherein only one of the counter stages can be actuated by this pulse. The particular counter stage that can be actuated by a pulse is the stage succeeding the stage that is initially actuated by resetting the counter. Thus a pulse applied along line 130 causes the counter to progress from stage 1 to stage 2, wherein stage 1 is cut off by stage 2 when the latter is turned on. One pulse applied to this first set of counter stages is the result of one nickel being deposited in the coin acceptor. Two pulses applied along line 130 represents one dime deposited in the coin acceptor and causes the counter to progress two stages. Although any suitable counter can be used, the particular counter employed is a ring counter having five stages.

The next group of counter stages, which includes four stages and is denoted stages 6–9, including a driver at output thereof, counts the number of quarter dollars deposited. Counter stages 6–9 are driven through connection 132 from counter driver 106, so that in the event that either quarters or half-dollars are deposited in the coin acceptor, these stages will be driven directly. That is to say, a single pulse is applied directly to stages 6–9 from driver 106 for each quarter-dollar deposited, and two pulses are directly applied from the driver for each half-dollar deposited. A pulse is also applied to stages 6–9 through connection 134 from stages 1–5 each time these stages count twenty-five cents deposited in nickels and dimes.

Pulses from stages 6–9 are applied to the next group of five stages 10–14 through connection 136, whereby one pulse is applied for each one dollar counted by stages 6–9. Moreover, one pulse is applied through connection 136 directly to stages 10–14 from driver 109 for each one-dollar bill deposited. It will thus be noted that there are four stages in the second group of counter stages. The third group of counter stages applied one output pulse to a final stage 15 through connection 138 for each five dollars counted by the third group of stages.

Each of the three groups of stages are ring counters, so that when the last stage thereof is actuated, the next pulse causes the first stage to be actuated and the last stage to be cut off. In the first group of stages, the ring is shown schematically completed by interconnection 131 between the last and first stages. These interconnections for the second and third groups of stages are denoted as connections 133 and 137, respectively.

Since each of the first stages is initially actuated when no money has been counted, the capacity of each group of stages is one denomination of money less than the total number of stages for that particular denomination represented by one pulse, or the lowest denominator of the group of stages. In the first group of stages, the denomination (or amount of money) represented by one pulse is one nickel. In the second group, it is one-quarter dollar, and in the third group, it is one dollar. Thus the total capacity of the money counter is equal to the addition of a five dollar count in the final stage 15, four dollars counted in stages 10–14, seventy-five cents counted in stages 6–9 and twenty cents counted in stages 1–5, or a total of $9.95.

Each of the counter stages has an output applied to the comparator, so that in systems shown, there are fifteen outputs from the money counter. These outputs are applied to corresponding drivers within the comparator, and the drivers are connected to a plurality of corresponding lamps L–1 through L–15, respectively. The drivers within the comparator are employed to provide a sufficient amount of electrical power to turn on the lamps within the comparator, and comprise amplifier stages. These are required only in the case when the SCR in the counter conducts very nearly the holding current. For SCR's which are designed to cut off via a gate pulse when conducting at a current substantially in excess of the holding current, sufficient current conducting capacity is provided by the SCR itself so that the lamp can be connected directly to the anode of the SCR, thus obviating the necessity for the buffer driver. All of these lamps are physically positioned to direct light on a photocell 180 connected at its terminals to the power relay 122. Thus if any of the lights are turned on, photocell 180 will represent a relatively low impedance, whereas if all of the lights are turned off, the impedance of photocell 180 will be relatively high.

Referring now to the gasolene quantity detector, drive shaft 30, which drives the dollar, dime and penny wheels of the mechanical computer of the gasolene pump, is provided with an extension shaft 150 for rotation therewith. Attached to the end of this extension is a disk 152 having a pair of holes 153 and 154 defined near the periphery thereof which are diametrically opposite each other. Support means 156 is provided to support a lamp 157 on one side of the disk 152 and photocell 158 on the other side of the disk. The lamp and photocell are positioned so that the light beam is aligned with holes 153 and 154 to direct the light beam onto the photocell when these holes are in the vertical position, respectively, at the top of the disk. Suitable optical shielding is provided between the periphery of the disk and the support means 156 so that light strikes photocell 158 only when one of the holes is in the vertical position as shown. Lamp 157 is connected at one terminal to supply voltage 64 and at the other terminal to ground 62. One terminal of photocell 158 is connected to the input of the counter driver 116, and the other terminal is connected to supply voltage 64.

One of the holes 153 and 154 is prealigned in a vertical position at the top of the disk when the penny wheel 27 of the gasolene pump shows either one of zero cents or five cents. As gasolene is delivered through dispenser 21, the mechanical computer of the gasolene pump runs accordingly and drives the money wheels therein. For each one-half of a complete revolution of the penny wheel 27, one of the holes 153 and 154 will come into alignment with the light beam from lamp 157 to actuate photocell 158 to a low impedance, thereby producing an output pulse to the input of the counter driver 116. Therefore, one voltage pulse is applied to the counter driver 116 for each one-half revolution of the penny wheel 27, or for each five cents of gasolene delivered. Thus the gasolene quantity monitor 110 monitors the quantity of gasolene delivered in terms of each five cents in money equivalent thereof.

The function of the counter driver 116 is identical to the counter driver previously described. Moreover, the gasolene quantity counter 19 is essentially identical to the money counter 16, with the exception that only one pulse shaper and counter driver 116 is used in conjunction therewith to drive the first group of counter stages. The reason for this will be apparent, since only a single denomination of money equivalent, which is five cents, is registered by the gasolene quantity detector, wherein this denomination, it will be noted, is equal to the smallest denomination registered by the money detector. Thus the gasolene quantity counter includes five counter stages within the first group of stages, four stages within the second group, five stages within a third group and a final fifteenth stage. Counter driver 116 applies an input pulse to each of the five counter stages of the first group for each pulse applied to the input thereof, wherein each pulse represents five cents. The ring counter of the first group of stages is schematically denoted by interconnection 165 between the fifth and first stages, with the rings denoted for the second and third groups by interconnections 169 and 171, respectively. The second group of stages is driven by the first group of stages through connection 168, the third group driven by the second group through connection 170 and the last stage driven by the third group through connection 172. It will be apparent that the total counting capacity of the gasolene quantity counter is equal to that of the money counter, or $9.95.

The gasolene quantity counter has an output stage for each of the individual counter stages, and thus fifteen outputs. These outputs are conneced to fifteen corresponding drivers within the comparator opposite the drivers connected to the money counter outputs, wherein these drivers are connected to the other terminals of the respective lamps L–1 through L–15 to provide power therefor. Thus the two drivers connected to different terminals of each lamp oppose each other in the sense that each is capable of applying a positive voltage to the terminal of the lamp to which it is connected. The opposing drivers, when not actuated by output signals, produce the same voltage magnitude and polarity as applied to the lamp, but when actuated, provide a conduction path to ground 62. Thus for example, if neither of the drivers connected to one of the lamps is activated by a signal from the money counter and gasolene quantity counter, the lamp will not be turned on because of the equal and opposite voltages applied to its two terminals from the two drivers. Should one of the drivers be actuated and the other not, the lamp will be turned on as a result of the conduction path to ground 62 provided by the actuated driver and the voltage applied to the lamp from the other driver.

As already noted, the counters are initially set by a reset circuit 190 to provide a proper starting point in the counting sequence. The reset circuit, when activated, will apply a voltage pulse to each of the first stages of the various groups of stages of both counters to cause these first stages to be activated. Accordingly, the reset circuit 190 is connected to stage 1 of the money counter by connection 192, to stage 6 of the money counter by connection 193 and to stage 10 of the money counter by connection 194. Similarly, the output of the reset circuit is connected to stage 1 of the gasolene quantity counter by connection 195, to stage 6 through connection 196 and to stage 10 through connection 197. Assuming that the power has just been applied to the counters and no money deposited in the coin acceptor, stages 1, 6 and 10 of each of the counters will be automatically activated, and the corresponding drivers within the comparator connected to opposite terminals of lamps L–1, L–6 and L–10 will provide conduction paths to ground 62 for both terminals of each lamp, thus maintaining these lamps off. Moreover, equal and opposite voltages are applied to the opposite terminals of the remainder of the lamps, so that none of these lamps are turned on. Consequently, photocell 180 connected to the power relay remains in a high impedance state, so that the power relay cannot actuate solenoid valve 23 to open. As soon as any money is deposited within the coin acceptor, the money counter will count the amount of money and generate an output signal at one or more of the outputs thereof. These outputs are uniquely characteristic of the amount of money deposited within the coin acceptor. Since no gasolene has been delivered at this time, the one or more drivers within the comparator connected to the actuated outputs of the money counter will provide conduction paths to ground 62 for the corresponding lamps, with the corresponding drivers connected to the gasolene quantity counter causing these lamps to turn on. The light from the lamps are directed on photocell 180 to cause it to go to a low impedance state to actuate the power relay and to open solenoid valve 23. Solenoid valve 23 will now remain open until the purchaser delivers a quantity of gasolene equivalent in money to the amount of money deposited, as counted by the gasolene quantity counter. When this quantity of gasolene has been delivered, all outputs of the gasolene quantity counter will be the same as all the corresponding outputs of the money counter to cause all the lamps to turn off, so that the power relay causes the solenoid valve to close.

Although the system can use many different counters for counting the money deposited and the quantity of gasolene delivered, the money counter in the embodiment described is divided into groups of stages which are adapted to handle and count the various denominations within a particular monetary system. As shown in FIGURE 2, the first group of stages is adapted to count nickels and dimes, the second group of stages is adapted to count quarters and half-dollars and the third group of stages is adapted to count dollars. It will be apparent that the entire counter can be made continuous without division between groups, but in this case the deposit of a quarter in the money acceptor would require the generation of five separate pulses into the counter, the deposit of a half-dollar would require the generation of ten separate pulses and the deposit of a dollar bill would require the generation of twenty separate pulses. Alternatively, the counter would have to be adapted with inputs that would provide an equivalent function to the several pulses in response to a single pulse. By dividing the counter into groups of stages, the counter is greatly simplified in that fewer pulses are required for driving the counter. In the particular embodiment shown in FIGURE 2 for use in Canada and the United States, the various groups of stages comprise individual ring counters, although other types of counters can be also used.

A typical five stage ring counter suitable for use is shown in FIGURE 3 and comprises five switching devices Q–1 through Q–5 for the five respective stages. These switching devices are, in this particular instance, semi-conductor controlled rectifiers. This type of device is commonly known and is characterized by a high impedance state between its conduction terminals (cathode and anode), but can be switched to a low impedance state when a supply voltage is applied across its conduction terminals during the time that a positive voltage pulse is applied to its gate terminal. Actually, the pulse applied to the gate terminal to switch the device to its low impedance state causes enough current to be conducted through the gate terminal to cause the device to switch. The semiconductor controlled rectifier is a latching device, so that once switched to the low impedance state, it will remain in this state until the supply voltage is removed from its conduction terminals. If the device, when in the low impedance state, conducts current very near the holding current required to sustain conduction, it can also be turned off by the application to its gate of a negative gate pulse. The latter mode for turning the device off is used in the counter to be described, wherein the negative gate pulse will decrease the conduction current sufficiently below its holding current to cause the device to switch back to its high impedance state.

The five semiconductor controlled rectifier switching devices Q–1 through Q–5 are connected at their anodes to +V (supply voltage 64) through resistors R–1 through R–5, respectively, and are connected at their cathodes to ground 62. Inputs are applied to the gates of the SCR's from line 130 from the pulse shaper and counter drivers that generate pulses in response to money deposited in the money acceptor. These inputs are provided from line 130 through five diodes D–1 through D–5 connected at their anodes to line 130 and at their cathodes to one terminal of capacitors C–1 through C–5, respectively. The other terminals of the capacitors are connected, respectively, to the gates of the five switching devices Q–1 through Q–5. The anode of each SCR is also connected back to the gate of the preceding SCR through a series combination of a capacitor, resistor and diode. Accordingly, the anode of controlled rectifier Q–2 is connected to the gate of rectifier Q–1 through the series combination of diode D–6, resistor R–11 and capacitor C–6. Similarly, the anode of SCR Q–3 is connected to the gate of SCR Q–2 through the series combination of diode D–7, resistor R–12 and capacitor C–7. The anode of SCR Q–4 is connected to the gate of SCR Q–3 through the series combination of diode D–8, resistor R–13 and capacitor C–8. The anode of SCR Q–5 is connected to the gate of SCR Q–4 through the series combination of diode D–9, resistor R–14 and capacitor C–9. Finally, the anode of SCR Q–1 is connected back to the gate of SCR Q–5 through the series combination of diode D–10, resistor R–15 and capacitor C–10. All of this constitutes an endless ring of switching devices that are interconnected as described. In addition, the anode of each SCR is connected to the gate of the following SCR through a series combination of another resistor and capacitor. Thus the anode of SCR Q–1 is connected to the gate of SCR Q–2 through resistor R–7 and capacitor C–2. The anode of SCR Q–2 is connected to the gate of SCR Q–3 through the series combination of resistor R–8 and capacitor C–3. The anode of SCR Q–3 is connected to the gate of SCR Q–4 through the series combination of resistor R–9 and capacitor C–4. The anode of SCR Q–4 is connected to the gate of SCR Q–5 through the series combination of resistor R–10 and capacitor C–5. And, the anode SCR Q–5 is connected back to the gate of SCR Q–1 through the series combination of resistor R–6 and capacitor C–1. Suitable biasing resistors are also provided that are interconnected between the gates of the various SCR's and ground 62. These biasing resistors comprise resistors R–16 through R–20 connected between ground and the interconnection of the resistor and capacitor which interconnect the anode of each SCR and the gate of the preceding SCR. Additional biasing resistors R–21 through R–25 are connected between the gates, respectively, of SCR's Q–1 through Q–5 and ground.

Each group of counter stages includes a driver stage connected to the output of the last switching device. This driver stage comprises a transistor Q–11 connected at its base to the anode of SCR Q–5. The collector of the transistor is connected directly to supply voltage 64 and at its emitter to ground 62 through a resistor R–36, thus constituting an emitter follower. This provides impedance matching between the output of the first group of counter stages and the input of the second group of counter stages, and acts as a driver for the latter. The output of the driver is taken at the emitter of the emitter follower through capacitor C–11 and across diode D–36 and resistor R–36, and is applied to the input of the next group of counter stages along connection 132 as shown in FIGURE 2. The capacitor allows only voltage pulses to be applied to the succeeding group of stages, where diode D–36 clamps any negative pulse at about −1 volt.

The first five drivers included within the comparator are also shown in FIGURE 3. These are referred to as buffer drivers, which are amplifying stages to provide the necessary power to turn on the lights L–1 through L–5. These buffer drivers comprise transistors Q–6 through Q–10 connected at their bases to the anodes of SCR's Q–1 through Q–5 through resistors R–26 through R–30, respectively. These transistor amplifiers are connected at their collectors to ground 62 and at their emitters to supply voltage 64 through resistors R–31 through R–35, respectively. The plurality of outputs of the counter, or the outputs 201 through 205 which are connected to lights L–1 through L–5, respectively, are connected to the respective emitters of the common collector transistors Q–6 to Q–10.

When the gasolene pump dispenser is replaced within its holder after a purchaser has used the pump, a switch is thrown, to be described below, which removes supply voltage 64 from the entire system, including removing this voltage from the anodes of the various SCR's within the counter. When the next purchaser removes the dispenser from its holder, the switch is thrown the other way to establish supply voltage on the entire system. Removal of the voltage from the various SCR's within the counter causes the SCR's to switch back to their high impedance state, but re-establishing the voltage on the anodes of the SCR's does not cause them to turn on, but only provides the supply of voltage necessary for conduction. To initially set the counter for the proper counting sequence, a positive voltage pulse from reset circuit 190 is applied to each of the first stages of each group of counter stages to cause the first SCR within that stage to be switched to a conductive or low impedance state. In the circuit shown in FIGURE 3, this voltage pulse is applied along 192 to the gate of SCR Q–1, wherein the positive voltage pulse switches SCR Q–1 to the low impedance state. When a nickel is dropped within the coin acceptor to cause a single voltage pulse to be applied to line 130, or when a dime is dropped within the coin acceptor to cause two voltage pulses to be applied to line 130, the pulse or pulses are applied to each of the anodes of diodes D–1 through D–5. However, only one of the SCR's within the group of counter stages can be caused to switch by the pulse. Initially, only SCR Q–1 is conducting, and all of the anodes of SCR Q–2 through Q–5 are at supply voltage, which causes diodes D–3, D–4, D–5 and D–1 to be reversed biased through resistors R–8, R–9, R–10 and R–6, respectively. Therefore, the positive voltage pulse on line 130 cannot be passed by these diodes, and consequently SCR's Q–3, Q–4, Q–5 and Q–1 cannot be turned on. However, the anode of SCR Q–1 is at a low voltage (essentially ground) so that diode D–2 through resistor R–7 is not reversed biased. Thus a positive voltage pulse will be passed by diode D–2 through capacitor C–2 and applied to the gate of SCR Q–2 to switch SCR Q–2 to the low impedance state to cause it to conduct. As a result, the anode of this SCR drops in voltage to very near ground potential. Because of the interconnection of the anode of SCR Q–2 back to the gate of SCR Q–1 through diode D–6, resistor R–11 and capacitor C–6, a negative voltage pulse will be applied to the gate of SCR Q–1 when the anode of SCR Q–2 falls in voltage. Moreover, the resistor valves within the circuit are such to permit the SCR's to conduct very nearly the holding current, and a negative pulse of this nature applied to the gate will cause the SCR to switch back to its high impedance state.

From the foregoing, it can be seen that only the SCR that is next succeeding that SCR conducting within the counter can be turned on with a positive voltage pulse along line 130, and in so doing, is effective to turn off the preceding SCR. It will also be apparent that the conduction of the various SCR's will proceed by the number of succeeding stages equal to the number of positive voltage pulses applied to line 30 and that the circuit comprises a ring counter to form a continuous ring for sequential switching.

When the last SCR Q–5 is rendered conductive by a voltage pulse applied through diode D–5, this is equivalent to four positive voltage pulses applied along line 130, or equivalent to twenty cents. When the next positive voltage pulse is applied along line 130 to render SCR Q–1 conductive diode D–1, SCR Q–5 is caused to turn off to raise the voltage of the anode thereof to supply voltage 64, thus applying a positive voltage pulse to the base of the driver transistor, or emitter follower, Q–11. In turn, a positive voltage pulse will be produced across resistor R–36 and applied to line 132 to the next group of counter stages.

This fifth positive voltage pulse along line 130, which also produces a positive voltage pulse to the input of the next group of counter stages, represents twenty-five cents, and thus the next group of counters registers twenty-five cents and the first group of counter stages is returned to its initial starting point.

When the SCR of a particular stage is non-conducting, the corresponding buffer driver transistor will be non-conducting, and thus apply the supply voltage 64 to the one terminal of the corresponding lamp to which it is connected at its emitter. When the SCR is rendered conductive to apply a low voltage (very nearly ground potential) to the base of the buffer driver transistor, the emitter of this transistor will be caused to approach ground potential to provide a conduction path to ground for the corresponding lamp.

In the particular system described in FIGURE 2, the next group of counter stages comprises four individual stages and thus will count up to seventy-five cents upon the application of three positive voltage pulses applied from the emitter follower transistor Q-11. Upon the fourth pulse being delivered thereto, it will return to its initial starting point and apply a positive voltage output to the next group of counter stages, which comprises five individual stages. Each voltage pulse applied to this latter group of stages represents one dollar, and it can count to four dollars before it applied a positive voltage pulse to a final counter stage 15. A voltage pulse applied to the final counter stage represents five dollars. Thus the total capacity of this particular system is five dollars for the final fifteenth stage, four dollars for the preceding five stages, seventy-five cents for the second group of stages and twenty cents for the first group of stages, or a total of $9.95. As is seen in FIGURE 2, the first group of stages is bypassed by pulses applied to line 132 in response to the deposit of quarters and half-dollars, and the second group of stages is bypassed by pulses applied to line 135 in response to the deposit of a one dollar bill.

The final fifteenth stage is shown in FIGURE 3 as connected by a dashed line to the output of the emitter follower transistors Q-11, since the counter just described is identical to the third group of counter stages. A positive voltage pulse is applied from transistor Q-11 to the gate of SCR Q-12 when the counter registers five dollars. This SCR is connected at its anode to supply voltage 64 through resistor R-37 and at its cathode to ground 62, with a biasing resistor R-38 connected between ground and its gate. Thus any positive voltage pulse applied to the gate of this SCR will cause it to switch to its low impedance state. Another buffer driver within the comparator comprising transistor Q-13 is connected at its base to the anode of controlled rectifier Q-12 through resistor R-39, is connected at its collector at ground 62 and is connected at its emitter to supply voltage 64 through resistor R-40. Light L-15 is connected at one terminal to the emitter of transistor Q-13.

The gasolene quantity counter is identical to the money counter, with the exception that all pulses generated by the gasolene quantity detector are applied to the first group of five stages. That is to say, there is no necessity for by-passing the first and second group of counter stages, since the gasolene quantity detector generates pulses only in response to a quantity of gasolene equivalent to five cents. The various outputs of the gasolene quantity counter are connected to corresponding buffer drivers within the comparator, and these buffer drivers are connected to the other terminals of lamps L-1 through L-15, respectively, opposite the buffer drivers to which the money counter outputs are connected.

An electrical schematic diagram of a pulse shaper and counter driver illustrative of each of the pulse shapers and counter drivers used by the system is shown in FIGURE 4, which is used to drive the various counters in the system in response to pulses from the detector photocells applied to the input thereof. The pulse shaper and counter driver has the function of providing a pulse of sufficient power to drive the counters, and shapes the pulse applied to its input to provide a more positive and sharper pulse than produced by the detector photocell. This pulse shaper and counter driver will be described with reference to photocells 54 and 58, although an identical pulse shaper is used in conjunction with photocells 70 and 72. Photocells 54 and 58 are connected between the bases, respectively, of two transistors Q-14 and Q-15 and ground 62, wherein transistor Q-14 and Q-15 are used for isolation purposes. The collectors of the two transistors are connected directly to supply voltage 64 and biasing resistors R-41 and R-42 are connected between the bases of the two transistors Q-14 and Q-15, respectively, and supply voltage 64. These two resistors also provide current conduction paths for the two photocells. The emitters of the two transistors are connected together and to ground potential 62 through resistor R-43, thus constituting a pair of emitter followers. The common emitters of the transistors are connected to the base of another transistor Q-16 through a resistor R-44 wherein transistor Q-16 in conjunction with another transistor Q-17 form a Schmitt trigger circuit for shaping the pulse. The two transistors Q-16 and Q-17 are connected together by a resistor R-45 connected between the collector of transistor Q-16 and the base of transistor Q-17. A resistor R-46 is connected between supply voltage and the collector of transistor Q-16, a resistor R-47 is connected between the collector of transistor Q-17 and supply voltage, the two emitters of the transistors are connected together and a resistor R-48 is connected between the common emitters and ground. Another biasing resistor R-49 is connected between the base of transistor Q-17 and ground. The output of the Schmitt trigger circuit is taken from the collector of transistor Q-17 and connected into an emitter follower comprising transistor Q-18 connected at its collector to supply voltage and at its emitter to ground through resistor R-50. The output of the counter driver is taken at the emitter of transistor Q-18 and applied to line 130 to the first group of counter stages.

When a nickel is dropped into the money acceptor and interrupts the light beam impinging on photocell 54, the impedance of photocell 54 will rise accordingly to apply a positive voltage to the base of transistor Q-14. A dime deposited in the money counter will apply a first positive voltage pulse to the base of transistor Q-14 from photocell 54 and, subsequently, a second positive voltage pulse to the base of transistor Q-15 from photocell 58. For each interruption of the light beam impinging on either photocell 54 and 58, the voltage across resistor R-43 rises accordingly and applies a positive voltage pulse to the base of transistor Q-16 of the Schmitt trigger circuit through resistor R-44. The Schmitt trigger circuit is an astable circuit in which transistor Q-17 conducts so long as no positive voltage is applied to the base of transistor Q-16 to cause it to conduct. When Q-16 conducts, Q-17 is turned off as a result of the reduction in voltage at its base as applied through resistor R-45 from the collector of Q-16, with a corresponding increase in voltage appearing at the collector of transistor Q-17 and applied to the base of emitter follower transistor Q-18 to cause its emitter voltage at the output to rise accordingly. When the voltage at the base of transistor Q-16 decreases below a predetermined magnitude, it will cut off and cause transistor Q-17 to switch back into a conduction state. The Schmitt trigger circuit functions to switch rapidly in response to a much slower varying voltage as derived, for example, from photocells 54 and 58, so that a well defined voltage pulse is generated to drive the counters.

The counter drivers 106 and 109 are identical to that just described, with the exception that counter driver 109 may or may not include a photocell within the one dollar bill detected, depending upon the nature of the dollar bill acceptor. Moreover, only one input to driver 109 is required for the single pulse generated for the one dollar bill. As to counter driver 116, the electrical logic to the input is reversed, and only a single input is required. That is to say, only a single emitter follower stage at the input is required for photocell 158, and since this photocell normally represents a high impedance until one of the holes 153 and 154 come into alignment to allow the light to impinge thereon to reduce its impedance, photocell 158 is connected between supply voltage and the base of the emitter follower transistor, with a resistor connected between the base of this transistor and ground. Thus a positive voltage pulse is applied to the base of the emitter follower of counter driver 116 when photocell 158 decreases in impedance, whereas a negative pulse would be applied if photocell 158 is connected the same as photocells 54 and 58. It will be understood, however, that counter driver 116 can be adapted to operate on a negative pulse using the reverse logic, or in response to the impedance of photocell 158 increasing after the light is again removed.

The low voltage power supply used in the system is shown in the electrical schematic diagram of FIGURE 5, wherein the power supply is used to supply +18 volts D.C. to the entire circuit. This power supply is supplied from 120 volts A.C., or other alternating voltage, connected to the terminals 90 of the primary 91 of the transformer T-1. The secondary 92 of the transformer is connected across a full wave rectifying bridge comprising diodes D-11, D-12, D-13 and D-14, with diodes D-11, D-12 being conductive during one-half cycle of the alternating current cycle and diodes D-13 and D-14 being conductive during the other one-half cycle. Transformer T-1 is a step-down transformer to reduce the input voltage to 24 volts A.C. A filter capacitor C-13 is connected across the rectifier bridge through a resistor R-53. An n-p-n transistor Q-19 is connected at its emitter and collector in series with the positive output side of the supply, with a Zener diode Z-1 connected between the base of the transistor and the ground side. A resistor R-54 is connected between the positive side preceding transistor Q-19 and the Zener diode, and a capacitor C-14 is connected in parallel with the Zener diode. Zener diode Z-1 will be rendered conductive in breakdown fashion at all times to maintain the voltage applied to the base of the transistor at a constant magnitude. Any variation in voltage from the rectifier bridge will result in more or less current drawn through resistor R-54 and Zener diode Z-1, wherein transistor Q-19 acts as an emitter follower with a constant voltage maintained on its output emitter. Capacitor C-14 is used to preclude Zener diode Z-1 from turning off as a result of a negative voltage spike from any source reflected through the power supply, and accomplishes this by filtering any suitable voltage variation.

A switch S-2 is included in one input side of the power supply from the secondary of transformer T-1 and is mechanically connected to a lever 230 through connection 232. Lever 230 forms a part of the holder of the gasolene dispenser within the gasolene pump, which lever is actuated to open switch S-2 when the dispenser is replaced within the pump. When the dispenser is removed from the pump for gasolene delivery by a customer, the customer manually turns lever 230 to a position which closes switch S-2, thus causing +24 volts to be supplied to the system. The reason for switch S-2 is so that the 24 volts is removed from the system when the dispenser is replaced. This allows the supply voltage to be removed from all switching devices within the counters to cause them to be switched back to their high impedance state, so that when the next user reapplies the supply voltage to the system, all switching devices are in the non-conductive state. Subsequently, the reset circuit automatically causes the first switching device within each of the groups of counter stages to switch to the low impedance state to provide for the proper counting sequence.

Referring again to FIGURE 2, it will be recalled that a power relay 112 is used to actuate solenoid valve 23. This power relay, in conjunction with photocell 180, is shown in the electrical schematic diagram of FIGURE 6, and comprises a pair of semiconductor controlled rectifiers Q-20 and Q-21 connected in parallel but in opposite polarities. These two controlled rectifiers are connected at one side between one secondary terminal 93 of transformer T-1 through connection 123 and at the other side to solenoid valve 23 through connection 124. The circuitry for actuating the solenoid valve is completed, as shown in FIGURE 2, by connection 125 from the other terminal of the solenoid valve to the other secondary terminal 94 of the transformer T-1. Photocell 180 is connected directly between the two gates of the controlled rectifiers to cause them to switch accordingly. It is commonly known that the gate-cathode junction of the controlled rectifier represents a diode and by connecting the photocell between the two gates of the controlled rectifiers, a voltage between terminals 123 and 124 will cause current to be conducted through the photocell by means of the gate-cathodes diodes of the controlled rectifiers. If the impedance of the photocell is low enough, a sufficient current will be drawn through the gate of the particular SCR across which a positive voltage is applied from the anode to the cathode to cause this device to switch to the low impedance state. The reason for two controlled rectifiers connected in opposite polarities will be evident from the fact that an alternating voltage is used to supply the controlled rectifiers for conduction. Should one of the controlled rectifiers be turned on during one-half cycle of the alternating voltage supply, it will be turned off during the next half-cycle.

It will be recalled from the operation of the system as described in conjunction with FIGURE 2 that one of the lights L-1 through L-15 will be turned on if the two counters are unbalanced, or register different counts, in which case their outputs are not the same. In this case, light will be directed onto photocell 180 from one of the lamps L-1 through L-15 and cause one of the controlled rectifiers Q-20 to conduct during one-half cycle of the alternating voltage supply and the other controlled rectifier Q-21 to conduct during the other half-cycle. Thus power will be continually supplied to solenoid valve 23 to maintain it open for the delivery of gasolene therethrough. Thus the particular controlled rectifier within the power relay that is conducting simply acts as a power switch to connect the solenoid valve 23 directly across the secondary 92 of transformer T-1. Upon the gasolene quantity counter counting to the same count as the money counter so that the two counters are balanced, none of lamps L-1 to L-15 will be turned on, and the impedance of photocell 180 will increase accordingly and become large enough so that neither of controlled rectifiers Q-20 and Q-21 can be gated on. Consequently, no power will be supplied to solenoid valve 23, and since solenoid valve 23 is normally a closed valve, the flow of gasolene will be cut off.

Each of lamps L-1 through L-15 is physically arranged to direct light on the single photocell 180. One embodiment of such an arrangement is shown in the exploded, perspective view of FIGURE 7, wherein lamps L-1 through L-15 are grouped together, indicated at numeral 240, and maintained in this arrangement by a suitable housing or by a suitable tape 242 wound about the lamps. The leads of the lamps are divided into two groups 243 and 244, with group 243 comprising one lead each for each of the lamps, and group 244 comprising the other lead of each of the lamps. Photocell 180, which comprises a circular metallic header 246 which contains the photocell element (not shown) is mounted directly against the face of the lamps. This photocell has a diameter sufficiently large so that the light from each of the lamps will be directed thereon. Leads 247 and 248 are hermetically sealed through the header 246 to the photocell element and are connected to the power relay 122 as shown in FIGURE 6. Thus photocell 180 will be activated when any one of lamps L–1 through L–15 is turned on.

An electrical schematic diagram of the reset circuit used in FIGURE 2 is shown in FIGURE 8, and comprises another semiconductor controlled rectifier Q–22 connected at its anode to supply voltage 64 through a resistor R–55 and at its cathode to ground potential 62. A unijunction transistor Q–23 is connected at one of its base terminals to the anode of the controlled rectifier and at its other base terminal to the gate of the rectifier through resistor R–56. A resistor R–57 is connected between the anode of the controlled rectifier and the emitter of the unijunction transistor, with a capacitor C–14 connected between the emitter of the unijunction transistor and ground potential 62. A resistor R–58 is connected between the base of the unijunction transistor that is interconnected to the gate of the controlled rectifier and to ground with the output of the reset circuit being taken at this interconnection and applied to line 191.

When a customer uses the system, he removes the gasolene dispenser from its holder and turns lever 230 to the position to activate the pump and the system. This applies voltage (+18 v.) from the power supply to all parts of the system and to the anode of controlled rectifier Q–22 through resistor R–55. It will be recalled that all of the counters stages have been turned off, and that now the supply voltage is applied thereto so that they can be activated. Since controlled rectifier Q–22 is a blocking device, it will not conduct when the supply voltage 64 is applied to the anode thereof. However, capacitor C–14 will charge through resistors R–55 and R–57 to a voltage sufficient to cause the unijunction Q–23 to fire. The time required for the capacitor to charge to this voltage is from about one to two seconds. When the unijunction transistor Q–23 fires, the charge on the capacitor is dumped and a positive voltage pulse is generated across resistor R–58 and applied to the output of the reset circuit along line 191. It will be recalled that connection 191 is applied to all of the first stages of each group of stages of both counters, so that each first stage of each group of stages is turned on. This positive voltage pulse is also applied to the gate of controlled rectifier Q–22 through resistor R–56 and causes this device to switch to its low impedance state. Since the controlled rectifier is a latching device, it will remain in the low impedance state until the supply voltage is removed therefrom. This will prevent capacitor C–14 from recharging and thus prevent unijunction Q–23 from firing again. It will therefore be seen that the reset circuit is a one shot circuit for generating a single pulse each time the supply voltage is removed and reapplied to the system.

The foregoing system can also be adapted for use in countries other than the United States and Canada, in which case the money acceptors or rejectors, as previously mentioned, are readily available for the various monetary units of the particuluar foreign countries. The gasolene pump mechanical computers are also readily available for use in these monetary systems. Only the counter stages of the system must be modified to account for the different coinage and monetary systems. Referring to the block diagram of FIGURE 9, the modified counters for a system adapted for use in Switzerland is shown, wherein the rest of the system and function is identical to that previously described. It will be apparent that the capacity of the system can be varied by use of more or less counter stages and variations in the number of stages within any particular group of stages. Accordingly, this system now to be described is designed to have the capacity of forty-nine francs, although this can be changed as desired. Each of the money counter and gasolene quantity counter is comprised of two groups of stages and a final stage with the two groups of stages each having five separate counter stages. The system is specifically designed to handle one, two and five franc pieces. For each one franc piece deposited in the money acceptor (not shown), a single pulse is applied to stages 1–5. For each two franc piece deposited, two pulses are applied to stages 1–5. For each five franc piece deposited, one pulse is applied to stages 6–10. Again, the groups of stages are initially preset so that the first stages are conducting. Thus the first group of stages 1–5 has a capacity to count a total of four francs, and on the deposit of the fifth one franc piece, it will apply a pulse to the second group of stages 6–10. The deposit of a five franc piece will completely bypass stages 1–5. The second group of stages 6–10 has a capacity to count twenty francs, so that upon the deposit of the next five franc piece, it will apply a single pulse to the final stage 11. Thus the total capacity of the counter is twenty-five francs in the final stage 11, twenty francs in the second group of stages 6–10 and four francs in the first group of stages 1–5, or a total of forty-nine francs. Similarly, one pulse is delivered to the first group of stages 1–5 of the gasolene quantity counter for each one franc equivalent of gasolene delivered.

A system designed for use in Great Britain is shown in the block diagram of FIGURE 10, wherein again, only the counters are shown. This system is designed with a capacity of ninety-nine and one-half shillings, wherein each of the money counter and the gasolene quantity counter comprises a first group of stages including four separate stages, a second group having five stages, a third group having five stages and a final fifteenth stage. One pulse is applied to the first group of stages 1–4 from a counter driver for each sixpence piece deposited, and two pulses are applied to the first group of stages 5–9 and for each two-shilling piece deposited. The channels of the money acceptor are arranged slightly differently from that previously described to handle the deposit of a half-crown piece, wherein a half-crown piece is equivalent to two and one-half shillings. It will be apparent that even multiples of coinage are not used in the case of the half-crown piece, and the money acceptor is arranged so that the half-crown piece, when deposited, interrupts a light beam to apply one pulse to the first group of stages 1–4 and interrupts another light beam to apply one pulse to the second group of stages 5–9. Stages 1–4 have the capacity to count one and one-half shillings, or three sixpence pieces, so that upon the deposit of another sixpence piece, one pulse will be applied to stages 5–9 from stages 1–4. Upon the deposit of another one shilling piece when the first group of stages has counted one and one-half shillings, one pulse will be applied from the first group of stages to the second group of stages and the first group of stages will be advanced two counts. Thus the total capacity of the system is as follows: One and one-half shillings for stages 1–4, eight shillings for the second group of stages 5–9, forty shillings for the third group of stages 10–14 and fifty shillings for the final stage 15, or a total of ninety-nine and one-half shillings. One pulse is applied to the first group of stages 1–4 of the gasolene quantity counter for each sixpence equivalent of gasolene delivered.

Although only three counter arrangements have been disclosed for use with three different monetary systems, respectively, it will be apparent that other modifications of the counters will be apparent for use with other monetary systems.

It has been shown that the gasolene pump is automatically turned off and shut down when the gasolene quantity counter registers a quantity of gasolene delivered that is equivalent in money to the amount of money deposited, so that corresponding and identical outputs of the two counters causes the complete removal of light on photocell 180 and the power relay 122 to close solenoid valve 23. It will be realized, however, that solenoid valve 23 cannot close instantaneously, and thus a slightly greater quantity of gasolene may be delivered than is actually paid for as determined by the length of time for the solenoid valve to close. Moreover, should the excess quantity of gasolene delivered be sufficient to cause the penny wheel within the gasolene mechanical computer to rotate at least one-half revolution, the gasolene quantity counter will start recounting from its initial sequence to unbalance the counters. In this case, light will again be directed on photocell 180 and cause the power relay to reopen solenoid valve 23, even if it has already closed. Consequently, the purchaser could then deliver gasolene that has not been paid for.

Although the above occurrence of excess delivery will be rare, if indeed ever, it is a possibility that should be taken into account. Actually, the excess quantity of gasolene delivered is normally inconsequential, unless solenoid valve 23 is physically large to enable a rapid gasolene delivery. Such a valve is desirable to shorten the delivery time, but should be cut off slightly prior to the delivery of all of the gasolene that is paid for. In this manner, the carry over will not exceed that which is paid for. To eliminate the problem of a small excess quantity of gasolene being delivered so that the purchaser receives exactly what has been paid for, and to completely eliminate the possibility of recycling the counters, another embodiment of the gasolene quantity detector can be employed in conjunction with a pair of solenoid valves as shown in the schematic diagram of FIGURE 9. Referring to this figure, the gasolene delivery line 22 is provided with a bypass conduit. Specifically, a main conduit 260, including a large solenoid valve 264, is employed to deliver gasolene at a fast rate. Another conduit 262 bypasses but communicates with conduit 260 and includes a smaller solenoid valve 266 through which gasolene can be delivered at a slower rate. During the delivery of the bulk of the gasolene that is paid for, solenoid valve 264 is open, but when the quantity of gasolene delivered in terms of the money equivalent thereof is within a specified amount of money of that paid for, solenoid valve 264 is closed and solenoid valve 266 is opened. Thus the rate at which the gasolene is delivered is reduced, so that when solenoid valve 266 is closed, any excess amount of gasolene delivered will be negligible. This does not insure that solenoid valve 264 will close if it is faulty or close within the required time interval. If solenoid valve 264 fails, but eventually closes, it is possible that the counter will have been reset and causes the power relay 122 to reopen the solenoid valve 264. To eliminate this problem, the voltage supply is removed from counter driver 116 upon solenoid valve 264 closing, so that even though solenoid valve 264 closes later than it should, there is no possibility that it can be reopened.

To provide for the proper actuation of solenoid valves 264 and 266, solenoid valve 264 is connected exactly as previously described with power relay 122 and the secondary 92 of transformer T-1. To actuate solenoid valve 266 at the proper time, a different gasolene quantity detector is employed and comprises a blade or bar 270 attached to the end of shaft 150 rather than the disk previously used. A first lamp 272 and corresponding photocell 274 aligned therewith are positioned so that when bar 270 is in a vertical position, as shown, the light impinging on photocell 274 will be interrupted. The shaft 150 is coupled to the penny wheel of the gasolene mechanical computer so that when bar 270 is in a vertical position, it coincides with the penny wheel indicating either one cent or six cents, as contrasted to the holes in the previous disk detector coinciding with the penny wheel indicating zero and five cents. Photocell 274 is connected to the counter driver 116 to provide the pulses for driving the gasolene quantity counter. Therefore, one pulse is delivered to the counter driver from photocell 274 for each one-half revolution of the penny wheel 27, whereby the pulses occur each time the penny wheel passes one cent and six cents.

Another lamp 276 and corresponding photocell 278 aligned therewith are positioned along an arc of approximately 160° from lamp 272 and photocell 274, so that when bar 270 rotates 160° from the position shown, it will interrupt the light beam impinging on photocell 278 from lamp 276. This angle corresponds to approximately four cents of gasolene delivered.

If photocell 278 is not employed, photocell 274 will cause the gasolene quantity counter to attain a money equivalent count equal to the money deposited prior to the time the full amount of gasolene is delivered. This is because of the coincidence of photocell 272 and bar 270 with the penny wheel indicating one cent or six cents. Thus photocell 274 and the gasolene quantity counter cause power relay 122 through photocell 180 to shut off the large solenoid valve 274 when the penny wheel of the mechanical computer of the gasolene pump is four cents less than the required delivery. However, the small solenoid valve is opened at this time, as will be described, and the delivery of gasolene is continued at a slower rate. When the blade 270 traverses the next 160 degrees, which is approximately equivalent to four cents delivery, it will generate an output pulse to close the smaller solenoid valve, and thus shut off the delivery of gasolene entirely. In this manner, a negligible excess quantity, if any, of gasolene will be delivered.

To enable the system to operate according to the foregoing description, a relay 280 is connected at the terminals of the relay coil in parallel with the large solenoid valve 264 by means of connections 281 and 282. So long as the solenoid valve 264 is open so that there is a voltage differential across its terminals, a voltage will be applied to relay 280 to cause dual relay contacts 284 and 286 to be positioned as shown. Relay contact 284 is connected at one terminal directly to counter driver 116 and at the other terminal to the low voltage power supply 96 to apply the supply voltage to the driver when the solenoid valve 264 is maintained opened. The other relay contact 286 is positioned to dummy poles during this time. The other poles of relay contact 286 are connected to one secondary terminal 94 of the secondary 92 of transformer T-1 through connection 289, and at the other pole to one side of a power relay comprising semiconductor controlled rectifiers Q-23 and Q-24 through connection 290. The other side of this power relay is connected to one terminal of the smaller solenoid valve being connected to the other secondary terminal 93 of transformer T-1 through connection 292. Photocell 278 is connected directly between the gates of the controlled rectifiers Q-23 and Q-24 by means of connections 293 and 294.

When the gasolene quantity counter registers a count corresponding to the money counter, which will be approximately four cents less than the actual quantity of gasolene paid for, power relay 122 will remove the power from the large solenoid valve 264 and cause the latter to close. Upon this occurrence, no current or voltage will be applied to relay 280, and thus relay contacts 284 and 286 will switch to the other pole connections. This removes the supply voltage from counter driver 116 by relay contact 284 breaking this connection, so that in the event that the large solenoid valve 264 does not close within the time that it should, the counters cannot be reset because of the inoperability of counter driver 116. When the large solenoid valve does close, should it be faulty, it cannot be reopened due to counter unbalance. Relay contact 286 also closes the connection to the power relay comprising rectifiers Q-23 and Q-24 so that the 24 volts A.C. is applied thereto. At the same time, light will be impinging upon photocell 278 and its impedance will accordingly be small. Thus rectifiers Q-23 and Q-24 are rendered conductive during alternate half-cycles of the supply voltage of the secondary of the transformer T-1, and the smaller solenoid valve 266 will be maintained open. When the bar 270 has traversed approximately 160 degrees from the vertical position to interrupt the light impinging on photocell 278, the rectifiers Q-23 and Q-24 can no longer switch to the low impedance, conductive states during alternative half-cycles because of the lack of gate signals thereto. This cuts off the smaller solenoid valve 266 after an additional four cents of gasolene has been delivered subsequent to the larger solenoid valve being closed. Since bar 270 will no longer rotate when all gasolene delivery has been stopped, it will be positioned between lamp 276 and photocell 278, thus maintaining solenoid valve 266 closed. Because of the smaller flow rate of gasolene through the smaller solenoid valve, only a negligible excess amount of gasolene, if any, will be delivered during the time that is required for the smaller valve to physically close.

A single counter means can be employed to count both the money deposited and the money equivalent of the gasolene quantity delivered, and one such counter means is shown in the electrical schematic diagram of FIGURE 11. This counter includes a series of $n$-counter stages, wherein each counter stage comprises a bistable conducting element, such as, for example, a flip-flop. The counter has two inputs 300 and 302 from the money detector and the gasolene quantity detector, respectively. Pulses are applied along these two inputs to the various stages of the counter, whereby pulses from the money detector drive the counter from left to right, or cause the counter stages to switch from one bistable state to the other in a sequence from left to right. Pulses from the gasolene quantity detector cause the counter stages to switch from the other bistable state to the original state in a sequence from right to left. Thus the counter will count up in one direction and count down in the other direction responsive to pulses from the money detector and the gasolene quantity detector, respectively. The counter has a single output and, in the embodiment shown, comprises a lamp L-20 which directs light onto photocell 180 of the power relay 122 for controlling the actuation of solenoid valve 23 of the gasolene pump.

The first counter stage includes two transistors Q-26 and Q-27, with the collector of transistor Q-26 connected to supply voltage 64 through the series combination of resistors R-60 and R-61. The collector of transistor Q-27 is connected to supply voltage through lamp L-20. A capacitor C-16 is connected between ground 62 and the interconnection of resistors R-60 and R-61. The two transistors comprise a bistable flip-flop circuit, wherein a resistor R-62 interconnects the collector of transistor Q-26 to the base of transistor Q-27, and a resistor R-64 biases the base of the latter transistor with respect to ground potential. The base of transistor Q-26 is connected to the collector of transistor Q-27 through resistor R-63, and a resistor R-65 biases the base of transistor Q-26 with respect to ground. The common emitters of the two transistors are connected to ground through diode D-16. A resistor R-66 connects the base of transistor Q-27 to the input 300 from the money detector. A series combination of capacitor C-17 and diode D-17 connect the base of transistor Q-26 to input 302 from the gasolene quantity detector.

The second stage is similar to the first stage with the exception of the input provided from the money detector and the connections to supply voltage. The collector of transistor Q-28 is connected to the supply voltage by resistor R-67 and R-68, and a capacitor C-18 is connected between ground and the interconnection of these two resistors. The collector of transistor Q-29 is connected to the supply voltage through resistor R-69. A resistor R-70 is connected from the collector of transistor Q-28 to the base of transistor Q-29, and a resistor R-72 provides a bias for the latter transistor with respect to ground. Resistor R-71 connects the collector of transistor Q-29 to the base of transistor Q-28, and another resistor R-73 provides a bias for transistor Q-28 with respect to ground. Diode D-18 connects the common emitters of the two transistors to ground potential. The base of transistor Q-29 is connected to input 300 from the money detector through the series combination of capacitor C-19 and diode D-19, and the base of transistor Q-28 is connected to the other input 302 from the gasolene quantity detector through a capacitor C-20 and diode D-20. The collector of the transistor Q-27 of the first stage is connected to the cathode of diode D-19 through a resistor R-74, and the collector of transistor Q-28 of the second stage is connected to the cathode of diode D-17 through another resistor R-75.

The third and following stages, with the exception of the last, or $n$th stage, are identical to the second stage, with only the third stage thereof being shown. The last stage differs from the second stage only in the connection made to the base of the first transistor Q-30, whereby only a resistor R-80 connects the base of this transistor to input 302.

When supply voltage is initially established on the counter by the purchaser removing the gasolene dispenser from its holder, voltage is supplied to all of the collectors of all of the transistors in the counter. However, capacitor C-16 in the first stage maintains the collector of transistor Q-26 at a relatively low voltage during the time that the capacitor requires for charging, wherein resistor R-61 is much greater than resistor R-60. Consequently, the base of transistor Q-27 will be maintained at a relatively low voltage through resistor R-62, and thus transistor Q-26 will be caused to conduct and transistor Q-27 will be maintained non-conductive. Therefore, lamp L-20 will not be turned on and photocell 180 will not be actuated to open solenoid valve 23 until money is deposited in the acceptor. Capacitor C-18 in the second stage provides a similar function to render the left transistor conductive, as is the case for all succeeding stages. When money is deposited into the acceptor, voltage pulses are applied along input 300 from the money detector to be counted by the counter. The first positive pulse at input 300 is applied to the base of transistor Q-27 through resistor R-66 to cause this transistor to conduct and the lamp L-20 to be turned on. Transistor Q-26 is switched off through the drop in collector voltage of transistor Q-27 applied to the base of transistor Q-26 through resistor R-63. The same positive pulse on input 300 is applied to the anode of diode D-19 connected to the base of transistor Q-29 of the second stage. However, diode D-19 is reverse biased through resistor R-74 by the relatively high collector voltage of transistor Q-27 just prior to this transistor being caused to conduct. Consequently, the pulse at input 300 is blocked by diode D-19. This pulse is also blocked by the other diodes connected to input 300 of the succeeding stages to prevent these stages from being switched. Once transistor Q-27 of the first stage is turned on, however, diode D-19 is then no longer reverse biased so that the next positive pulse at input 300 will cause transistor Q-29 of the second stage to turn on and transistor Q-28 to turn off. This second positive pulse is blocked by the diode of the succeeding stages in the same manner as just described. Thus the stages of the counter will be switched from one stable state to the other in sequential order responsive to a sequence of positive pulses applied to input 300, wherein the switching sequence progresses from left to right in the schematic diagram. A sufficient number of stages are provided for the desired total money capacity, wherein each voltage pulse applied to input 300 is representative of the smallest denomination of money which the acceptor will accommodate. It will be seen that lamp L-20 will remain turned on so long as transistor Q-27 is conducting, and it will be shown that transistor Q-27 can be turned off by a pulse from the gasolene quantity detector only after all of the succeeding stages have switched back to their original states.

As gasolene is delivered, a series of positive voltage pulses will be applied to input 302 to cause sequential switching of the various counter stages back to their original states in a sequence that progresses from right to left. A positive pulse at input 302 will be applied to the anodes of all of the diodes connected to the bases of the left transistor in each of the stages. If, for example, the second stage has been switched to the right side by pulses applied to input 300, the first stage cannot be switched back by a positive pulse applied to input 302. That is to say, if transistor Q-28 of the second stage is not conducting, diode D-17 will be reverse biased through resistor R-74 by the relatively high voltage at the collector of transistor Q-28, and will therefore block the positive pulse applied to input 302. If the third counter stage has been switched by pulses applied to input 300, diode D-20 will block the positive pulse along input 302 for the same reason and prevent the second state from being switched back to its initial state. The first positive pulse applied to input 302 will cause the last stage of the counter that was switched by a pulse applied through input 300 to be switched back to its initial state, since the next succeeding stage is conducting in the opposite bistable state and will not reverse bias the diode of the last switched stage. It will be seen that the last, or $n$th, stage of the counter does not require a capacitor and diode connection from input 302 to the base of the left transistor, since there is no succeeding or following stage. Thus if this stage has been switched by pulses applied to input 300, it will be the first stage switched back to its initial state by means of a pulse applied to input 302. As each stage in the counter is switched back to its initial state by pulses applied to input 302, it will eliminate the reverse biasing on the diode of the preceding stage which is connected to input 302, so that the next pulse can switch the next preceding stage. When a quantity of gasolene has been delivered equivalent in money to the money deposited, the first stage will be switched back to its initial state, so that lamp L-20 is turned off by the turning off of transistor Q-27 and the turning on of transistor Q-26. Upon this occurrence, light no longer impinges on photocell 180 and the latter is deactivated to shut off the gasolene delivery through the power relay 122.

The counter just described is adapted to sequentially switch in one direction through a number of stages equal to the number of pulses applied to input 300, and adapted to sequentially switch in an opposite direction through a number of stages equal to the number of pulses applied to input 302. Thus the same number of pulses are required to cut off lamp L-20 from the gasolene quantity detector as counted from the money detector. Although as many stages can be used as needed to provide for the desired money capacity, this number can be maintained at a minimum by adapting the money acceptor to accommodate a minimum denomination, such as one-quarter dollar, for example. In such case, the gasolene quantity detector can be provided with any suitable circuit which generates one pulse applied to input 302 for each five pulses generated by the optical transducer operating in conjunction with the penny wheel of the pump.

It will sometimes be desirable to provide a system that is manually controllable by an operator. That is to say, there are certain instances in which it is desirable that the system be maintained by an attendant to prevent misuse by the customer. In such case, it will be seen that some of the equipment of the system can be obviated as to the functions performed by the attendant. In particular, the purchaser can give the attendant the amount of money for the gasolene to be purchased and the attendant will then manually actuate the pump by turning on lamps corresponding to the lamps of the system shown in FIGURE 2. Therefore, the means for actuating the pump can serve the same function as the money counter, whereby a combination of voltage outputs are manually actuated to turn on a corresponding combination of lamps which are uniquely characteristic of the amount of money paid for the gasolene. As the purchaser delivers the gasolene, the output will be canceled when the quantity of gasolene delivered in the money equivalent thereof is equal to the amount of money given to the attendant. The manually actuated voltage outputs operate in conjunction with the gasolene quantity counter in exactly the same manner as previously described. Thus the money detector and money counter are obviated by the manual actuation of optical output means which are eventually canceled by the delivery of the gasolene. It will be seen that the gasolene quantity detector and counter are still necessary in such a system to provide automatic cut-off of the pump when the proper quantity of gasolene has been dispensed.

Although the invention has been described with reference to particular embodiments thereof, many modifications and substitutions can be made that do not depart from the true scope of the invention. For example, many different counters other than those described can be employed in the money and gasolene quantity computers. Moreover, all electrical logic in the system can be changed in the sense of reversing polarities in appropriate places, and yet achieve the same result. Accordingly, it is intended that the invention be limited only as defined in the appended claims.

We claim:
1. A system responsive to the deposit of money therein for actuating a gasolene pump to deliver a quantity of gasolene equivalent to the amount of money deposited, comprising:
   (a) an acceptor into which money is deposited,
   (b) first detector means operatively connected to said acceptor for detecting the amount of money deposited in said acceptor to generate a first signal representative of the amount of said deposited money,
   (c) second detector means operatively connected to said gasolene pump for monitoring the amount of said gasolene delivered in terms of the money equivalent thereof to generate a second signal representative of said money equivalent,
   (d) first counter means having a plurality of stages actuated responsive to said first signal,
   (e) second counter means having a corresponding plurality of stages actuated responsive to said second signal,
   (f) comparator means responsive to said first and said second counters for producing an output when any of said plurality of stages of said first counter means is actuated and for canceling said output when all of the actuated stages of said first counter means correspond, respectively, with all of the actuated stages of said second counter means, and
   (g) gasolene delivery control means operatively connected to said gasolene pump and responsive to said output for actuating said pump for the delivery of gasolene for shutting off said gasolene delivery when said output is canceled.

2. A system as set forth in claim 1 wherein said acceptor includes a plurality of channels through which different denominations of money pass when deposited, said first detector means includes optical means for directing light beams across said plurality of channels which are interrupted by the passage of said money denominations therethrough to generate said first signal, and said second detector means includes a transducer for monitoring the mechanical computer within said gasolene pump to generate said second signal responsive to the money computation of said mechanical computer which is equivalent to the quantity of gasolene delivered.

3. A system as set forth in claim 2 wherein said output produced by said first means is a light beam, and said second means comprises photosensitive means onto which said output light beam is directed for actuating a valve in the gasolene delivery line of said pump in response to said output light beam.

4. A system responsive to the deposit of money therein for actuating a gasolene pump to deliver a quantity of gasolene equivalent to the amount of money deposited, comprising:
   (a) first means operatively connected to said gasolene pump including an acceptor into which money is deposited for producing an output in response to the deposit of money and for monitoring the quantity of gasolene delivered to cancel said output when the gasolene delivered is a predetermined quantity less in money equivalent thereof than the amount of said money deposited, (b) said first means further including a member which is rotated with a money wheel of the computer within said gasolene pump and a first optical means for producing a first light beam which is recurrently interrupted by said member as said member rotates, (c) second means operatively connected to a first valve in the gasolene delivery line of said pump responsive to said output of said first means for opening said first valve for the delivery of gasolene therethrough, and for closing said first valve when said output is canceled, and (d) third means operatively connected to a second valve in said gasolene delivery line bypassing said first valve and responsive to said first means for monitoring the quantity of gasolene delivered to close said second valve when an additional quantity of gasolene equal to said predetermined quantity has been delivered after said first valve has been closed, (e) said third means further including second optical means for producing a second light beam which is recurrently interrupted by said member as said member rotates.

5. A system as set forth in claim 4 wherein said first light beam is interrupted by said member when the gasolene delivered is a predetermined quantity less in money equivalent thereof than the amount of said money deposited to cause said output to be canceled, and said second light beam is interrupted by said member when the money equivalent of the quantity of gasolene delivered is equal to the amount of said money deposited to cause said second valve to be closed.

6. A system as set forth in claim 4 wherein the rate of delivery of gasolene through said first valve is greater than the rate of delivery of gasolene through said second valve.

7. A system responsive to the deposit of money therein for actuating a gasolene pump to deliver a quantity of gasolene equivalent to the amount of money deposited, comprising:

(a) first detector means including an acceptor into which money is deposited for generating a first series of electrical pulses representative of said money deposited, (b) first counter means having a first plurality of outputs which are successively actuated responsive to said first series of electrical pulses in various unique combinations thereof that are uniquely characteristic of different amounts of money deposited, (c) second detector means operatively connected to said gasolene pump for monitoring the quantity of gasolene delivered in terms of the money equivalent thereof for generating a second series of electrical pulses representative of amounts of money equivalent of the gasolene quantity delivered, (d) second counter means having a second plurality of outputs corresponding, respectively, to said first plurality of outputs which are successively actuated responsive to said second series of electrical pulses in various unique combinations thereof that are uniquely characteristic of different amounts of money equivalent of gasolene deposited, and which combinations are identical, respectively, to the combinations of said first plurality of outputs for identical money amounts and money equivalent amounts, and (e) comparator means operatively connected to said gasolene pump and responsive to said first and said second pluralities of outputs to actuate said pump for the delivery of gasolene when the actuated combinations of said first and said second pluralities of outputs are non-identical, and to shut off the delivery of gasolene when said actuated combinations of said outputs are identical.

8. A system as set forth in claim 7 wherein said comparator includes a plurality of lamps connected between corresponding outputs, respectively, of said first and said second pluralities of outputs, light responsive means onto which light from each of said plurality of lamps is directed, and actuator means for opening a valve in the gasolene delivery line responsive to light directed onto said light responsive means from any one of said plurality of lamps and for closing said valve in the absence of any light directed onto said light responsive means; and the respective lamps are turned on only when one of the outputs connected thereto of said first and said second pluralities of outputs is actuated.

9. A system as set forth in claim 8 wherein said first and said second pluralities of outputs are characterized by voltage applied to said plurality of lamps, respectively, and said voltages are changed when said outputs are actuated.

10. A system as set forth in claim 8 wherein said acceptor includes a plurality of channels through which different denominations of money are passed, respectively, said first detector means includes first optical means for directing light beams across said channels which are interrupted by said denominations passing therethrough to generate said first series of pulses, and said second detector includes a member which is rotated with a money wheel of the computer within said gasolene pump and second optical means for producing a light beam which is recurrently interrupted by said member as a function of the rotation thereof to generate said second series of pulses.

11. A system as set forth in claim 10 wherein said first detector means generates one pulse in said first series of pulses for each of the smallest denominations of money which said acceptor will accommodate, and said second detector means generates one pulse for each money equivalent of gasolene quantity delivered which is equal to said smallest denomination.

12. A system as set forth in claim 10 wherein said member includes a hole through which said light beam is momentarily directed by said second optical means for each complete revolution of said member.

13. A system as set forth in claim 10 wherein said member momentarily interrupts said light beam of said second optical means as a function of the rotation thereof.

References Cited

UNITED STATES PATENTS

| | | | |
|---|---|---|---|
| 2,237,132 | 4/1941 | Christensen | 194—1 |
| 2,573,112 | 10/1951 | Schneckenburger | 222—2 X |
| 3,221,860 | 12/1965 | Klaffky | 222—2 X |
| 3,279,480 | 10/1966 | Jarvis | 133—8 |

SAMUEL F. COLEMAN, *Primary Examiner.*